US 12,554,699 B2

(12) United States Patent
Neil et al.

(10) Patent No.: US 12,554,699 B2
(45) Date of Patent: Feb. 17, 2026

(54) METHOD AND SYSTEM FOR IMPLEMENTING A DATA CORRUPTION DETECTION TEST

(71) Applicant: The Toronto-Dominion Bank, Toronto (CA)

(72) Inventors: Tyler Austin Neil, Ottawa (CA); Kathleen Bell, Ottawa (CA)

(73) Assignee: The Toronto-Dominion Bank, Toronto (CA)

( * ) Notice: Subject to any disclaimer, the term of this patent is extended or adjusted under 35 U.S.C. 154(b) by 105 days.

(21) Appl. No.: 18/364,945

(22) Filed: Aug. 3, 2023

(65) Prior Publication Data

US 2025/0045270 A1 Feb. 6, 2025

(51) Int. Cl.
*G06F 11/36* (2025.01)
*G06F 11/07* (2006.01)
*G06F 11/3668* (2025.01)
*G06F 16/23* (2019.01)

(52) U.S. Cl.
CPC ...... *G06F 16/2365* (2019.01); *G06F 11/0751* (2013.01); *G06F 11/0793* (2013.01); *G06F 11/3668* (2013.01); *G06F 11/3684* (2013.01); *G06F 11/0709* (2013.01)

(58) Field of Classification Search
CPC ............. G06F 11/3668; G06F 11/3676; G06F 11/3692; G06F 11/3684; G06F 11/0793; G06F 11/0709; G06F 11/0751
See application file for complete search history.

(56) References Cited

U.S. PATENT DOCUMENTS

| | | | | |
|---|---|---|---|---|
| 5,371,883 A | * | 12/1994 | Gross | G06F 11/3688 714/E11.208 |
| 9,710,367 B1 | | 7/2017 | Nagineni | |
| 10,241,898 B2 | | 3/2019 | Argrawal | |
| 10,318,412 B1 | * | 6/2019 | McKearney, Jr. | G06F 11/3684 |
| 10,817,283 B1 | * | 10/2020 | Naik | G06F 11/3612 |
| 10,942,840 B2 | | 3/2021 | Reddy et al. | |
| 11,126,543 B2 | | 9/2021 | Ellis et al. | |

(Continued)

FOREIGN PATENT DOCUMENTS

| | | |
|---|---|---|
| CN | 112817875 A | 5/2021 |
| CN | 113190460 A | 7/2021 |

(Continued)

*Primary Examiner* — Yolanda L Wilson
(74) *Attorney, Agent, or Firm* — Rowand LLP

(57) ABSTRACT

A system comprises at least one processor; and a memory coupled to the at least one processor, the memory storing processor-executable instructions that, when executed, configure the at least one processor to receive a request to create a data corruption detection test; generate a set of operations to create the data corruption detection test, at least one of the operations including a request to generate error-identification processor-executable instructions; conduct an automated review of the data corruption detection test to confirm that the set of operations to create the data corruption detection test are complete; and implement the data corruption detection test to determine whether one or more functions performed according to processor-executable instructions of a function-performing module were performed according to a defined rule.

20 Claims, 4 Drawing Sheets

(56) References Cited

U.S. PATENT DOCUMENTS

| | | | | |
|---|---|---|---|---|
| 2002/0029377 A1* | 3/2002 | Pavela | ................ | G06F 11/3696 |
| | | | | 717/124 |
| 2006/0168476 A1* | 7/2006 | Kehne | ................... | G06F 11/263 |
| | | | | 714/30 |
| 2007/0094543 A1* | 4/2007 | Joshi | ................... | G06F 11/3688 |
| | | | | 714/38.14 |
| 2016/0239295 A1* | 8/2016 | Kolesnik | ................... | G06F 8/30 |
| 2018/0217921 A1* | 8/2018 | Palyekar | ............. | G06F 11/3688 |
| 2024/0281419 A1* | 8/2024 | Alfaras | ................ | G06F 16/215 |

FOREIGN PATENT DOCUMENTS

| | | | | |
|---|---|---|---|---|
| CN | 113485911 | A | | 10/2021 |
| CN | 113553263 | A | | 10/2021 |
| CN | 113778866 | A | | 12/2021 |
| CN | 114240622 | A | | 3/2022 |
| CN | 114372001 | A | | 4/2022 |
| CN | 113468052 | B | | 7/2022 |
| CN | 115185828 | A | | 10/2022 |
| CN | 115185848 | A | | 10/2022 |
| CN | 115203036 | A | | 10/2022 |
| CN | 111078536 | A | | 4/2023 |
| KR | 20090077388 | A | * 7/2009 | .............. G06F 11/22 |

\* cited by examiner

METHOD AND SYSTEM FOR IMPLEMENTING A DATA CORRUPTION DETECTION TEST

TECHNICAL FIELD

The present application relates to methods and systems for implementing a data corruption detection test.

BACKGROUND

Computer program code, when executed by a processor, may configure the processor to perform one or more functions. Data corruption in computer program code may result in the one or more functions being performed in error.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
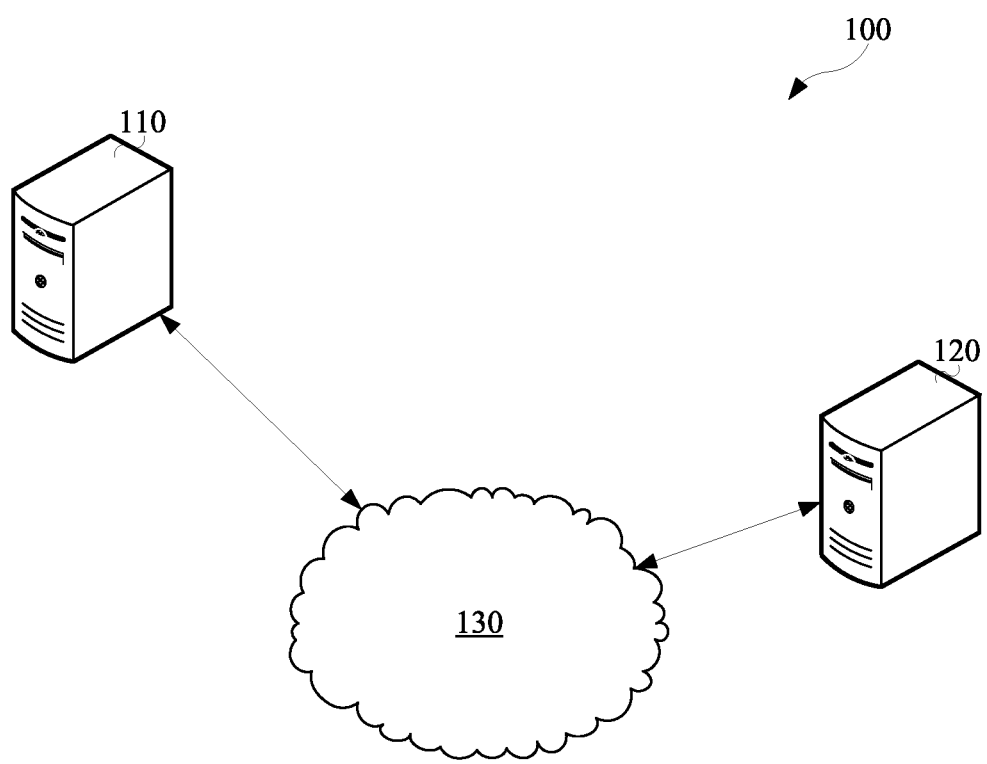
FIG. 1 is a schematic operation diagram illustrating an operating environment of an example embodiment.

Accordingly, in one aspect there is provided a system comprising at least one processor; and a memory coupled to the at least one processor, the memory storing processor-executable instructions that, when executed, configure the at least one processor to receive a request to create a data corruption detection test; generate a set of operations to create the data corruption detection test, at least one of the operations including a request to generate error-identification processor-executable instructions; conduct an automated review of the data corruption detection test to confirm that the set of operations to create the data corruption detection test are complete; and implement the data corruption detection test to determine whether one or more functions performed according to processor-executable instructions of a function-performing module were performed according to a defined rule.

In one or more embodiments, when implementing the data corruption detection test, the processor-executable instructions, when executed by the at least one processor, further configure the at least one processor to execute the error-identification processor-executable instructions to cause the at least one processor to determine whether the one or more functions performed according to the processor-executable instructions of the function-performing module were performed according to the defined rule.

In one or more embodiments, the processor-executable instructions, when executed by the at least one processor, configure the at least one processor to determine that the one or more functions were not performed according to the defined rule; and in response to determining that the one or more functions were not performed according to the defined rule, generate a notification indicating data corruption.

In one or more embodiments, the data corruption indicates an error in the processor-executable instructions of the function-performing module.

In one or more embodiments, responsive to conducting the automated review of the data corruption detection test, the processor-executable instructions, when executed by the at least one processor, configure the at least one processor to assign the data corruption detection test for a secondary review; and receive an indication that the data corruption detection test has passed the secondary review.

In one or more embodiments, when implementing the data corruption detection test, the processor-executable instructions, when executed by the at least one processor, configure the at least one processor to change a status of the data corruption detection test from in development to live.

In one or more embodiments, the processor-executable instructions, when executed by the at least one processor, configure the at least one processor to periodically implement the data corruption detection test to determine whether one or more functions performed according to the processor-executable instructions of the function-performing module were performed according to the defined rule.

In one or more embodiments, the processor-executable instructions, when executed by the at least one processor, configure the at least one processor to responsive to implementing the data corruption detection test to determine whether one or more functions performed according to the processor-executable instructions of the function-performing module were performed according to the defined rule, automatically communicate results of the data corruption detection test to one or more electronic addresses.

In one or more embodiments, the one or more functions are performed in association with at least one data record.

In one or more embodiments, the set of operations include creating a test plan, creating a test purpose, the request to generate the error-identification processor-executable instructions, passing the automated review, passing a secondary review, and output validation.

According to another aspect there is provided a computer-implemented method performed by at least one processor, the method comprising receiving a request to create a data corruption detection test; generating a set of operations to create the data corruption detection test, at least one of the operations including a request to generate error-identification processor-executable instructions; conducting an automated review of the data corruption detection test to confirm that the set of operations to create the data corruption detection test are complete; and implementing the data corruption detection test to determine whether one or more functions performed according to processor-executable instructions of a function-performing module were performed according to a defined rule.

In one or more embodiments, when implementing the data corruption detection test, the method further comprises executing the error-identification processor-executable instructions to cause the at least one processor to determine whether the one or more functions performed according to the processor-executable instructions of the function-performing module were performed according to the defined rule.

In one or more embodiments, the method further comprises determining that the one or more functions were not performed according to the defined rule; and in response to determining that the one or more functions were not performed according to the defined rule, generating a notification indicating data corruption.

In one or more embodiments, the data corruption indicates an error in the processor-executable instructions of the function-performing module.

In one or more embodiments, responsive to conducting the automated review of the data corruption detection test, the method further comprises assigning the data corruption detection test for a secondary review; and receiving an indication that the data corruption detection test has passed the secondary review.

In one or more embodiments, when implementing the data corruption detection test, the method further comprises changing a status of the data corruption detection test from in development to live.

In one or more embodiments, the method further comprises periodically implementing the data corruption detection test to determine whether one or more functions performed according to the processor-executable instructions of the function-performing module were performed according to the defined rule.

In one or more embodiments, the method further comprises responsive to implementing the data corruption detection test to determine whether one or more functions performed according to the processor-executable instructions of the function-performing module were performed according to the defined rule, automatically communicating results of the data corruption detection test to one or more electronic addresses.

In one or more embodiments, the one or more functions are performed in association with at least one data record.

According to another aspect there is provided at least one non-transitory computer readable storage medium comprising processor-executable instructions which, when executed, configure at least one processor to receive a request to create a data corruption detection test; generate a set of operations to create the data corruption detection test, at least one of the operations including a request to generate error-identification processor-executable instructions; conduct an automated review of the data corruption detection test to confirm that the set of operations to create the data corruption detection test are complete; and implement the data corruption detection test to determine whether one or more functions performed according to processor-executable instructions of a function-performing module were performed according to a defined rule.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, aspects of the disclosure transform a general-purpose computer into a special-purpose computing device when configured to execute the instructions described herein.

In the present application, various functionalities discussed herein may be performed by a single processor or by any one of one or more processors, either alone or in combination.

FIG. 1 is a block diagram illustrating an operating environment of an example embodiment. Various components cooperate to provide a system 100 which may be used, for example, for performing functions on data records, for implementing a data corruption detection test and/or for detecting data corruption using the data corruption detection test. As shown, the system 100 includes a first server computer system 110 and a second server computer system 120 coupled to one another through a network 130, which may include a public network such as the Internet and/or a private network.

The first server computer system 110 may maintain a database that includes various data records. For example, the first server computer system 110 may be a financial institution server which may maintain customer bank accounts. In this example, a data record may, for example, reflect an amount of value stored in a particular account associated with a user. As will be described in more detail below, the data records may be associated with one or more defined rules. The first server computer system 110 may include a function-performing module comprising processor-executable instructions that, when executed by a processor, configure the processor to perform one or more functions associated with one or more data records. The one or more functions may be performed according to the defined rules.

The second server computer system 120 may include a data corruption detection module comprising processor-executable instructions that, when executed by a processor, configure the processor to implement one or more data corruption detection tests to determine whether functions performed on the data records were performed according to defined rules. Put another way, the one or more data corruption detection tests may identify one or more functions performed by the function-performing module of the first server computer system 110 in association with one or more data records and may determine that the one or more functions were not performed according to defined rules. As a result, the one or more data corruption detection tests may generate notifications indicating data corruption detection. The data corruption may be, for example, the result of one or more errors in the processor-executable instructions of the function-performing module of the first server computer system 110. The data corruption may additionally or alternatively be the result of a computer virus and/or hardware issues. Data corruption may additionally or alternatively indicate that the processor-executable instructions of the function-performing module have been compromised, tampered with or otherwise corrupted.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

The first server computer system 110 and the second server computer system 120 may be in geographically disparate locations. Put differently, the first server computer system 110 and the second server computer system 120 may be remote from one another.

FIG. 1 illustrates an example representation of components of the system 100. The system 100 can, however, be implemented differently than the example of FIG. 1. For example, the data corruption detection module and the function-performing module may be implemented on a single server computer system. When implemented on a single server computer system, the data corruption detection module and the function-performing module are separate modules, as will be described in more detail below.

Figure 2:
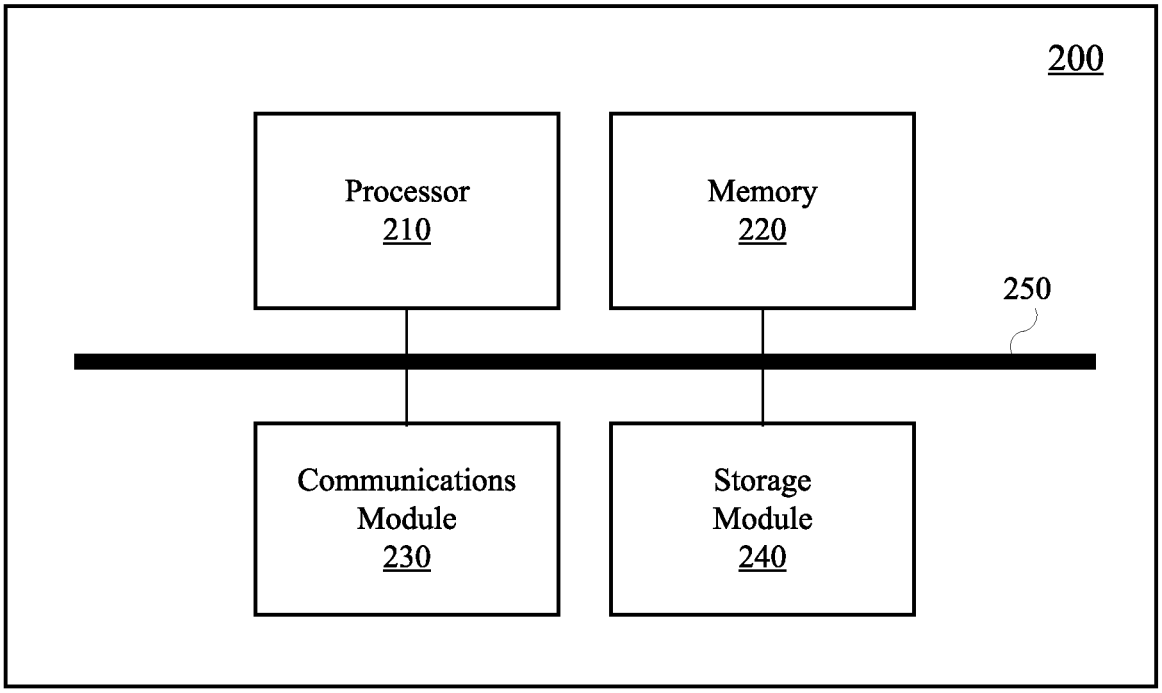
FIG. 2 is a high-level schematic diagram of an example computer device.

The first server computer system 110 and the second server computer system 120 are computer devices. Referring now to FIG. 2, a high-level operation diagram of an example computer device 200 is shown. In some embodiments, the computer device 200 may be exemplary of the first server computer system 110 and/or the second server computer system 120.

The example computer device 200 includes a variety of modules. For example, as illustrated, the example computer device 200 may include a processor 210, a memory 220, a communications module 230, and/or a storage module 240. As illustrated, the foregoing example modules of the example computer device 200 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory processor-readable storage medium. A processor-readable medium may be organized using a file system such as may be administered by an operating system governing overall operation of the example computer device 200.

The communications module 230 allows the example computer device 200 to communicate with other computer or computing devices and/or various communications networks. For example, the communications module 230 may allow the example computer device 200 to send or receive communications signals. Communications signals may be sent or received according to one or more protocols or according to one or more standards. For example, the communications module 230 may allow the example computer device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 230 may allow the example computer device 200 to communicate using near-field communication (NFC), via Wi-Fi™, using Bluetooth™ or via some combination of one or more networks or protocols. In some embodiments, all or a portion of the communications module 230 may be integrated into a component of the example computer device 200. For example, the communications module may be integrated into a communications chipset. In some embodiments, the communications module 230 may be omitted such as, for example, if sending and receiving communications is not required in a particular application.

The storage module 240 allows the example computer device 200 to store and retrieve data. In some embodiments, the storage module 240 may be formed as a part of the memory 220 and/or may be used to access all or a portion of the memory 220. Additionally or alternatively, the storage module 240 may be used to store and retrieve data from persisted storage other than the persisted storage (if any) accessible via the memory 220. In some embodiments, the storage module 240 may be used to store and retrieve data in a database. A database may be stored in persisted storage. Additionally or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely. The storage module may also be referred to as a data store.

Software comprising instructions is executed by the processor 210 from a processor-readable medium. For example, software may be loaded into random-access memory from persistent storage of the memory 220. Additionally or alternatively, instructions may be executed by the processor 210 directly from read-only memory of the memory 220.

Figure 3:
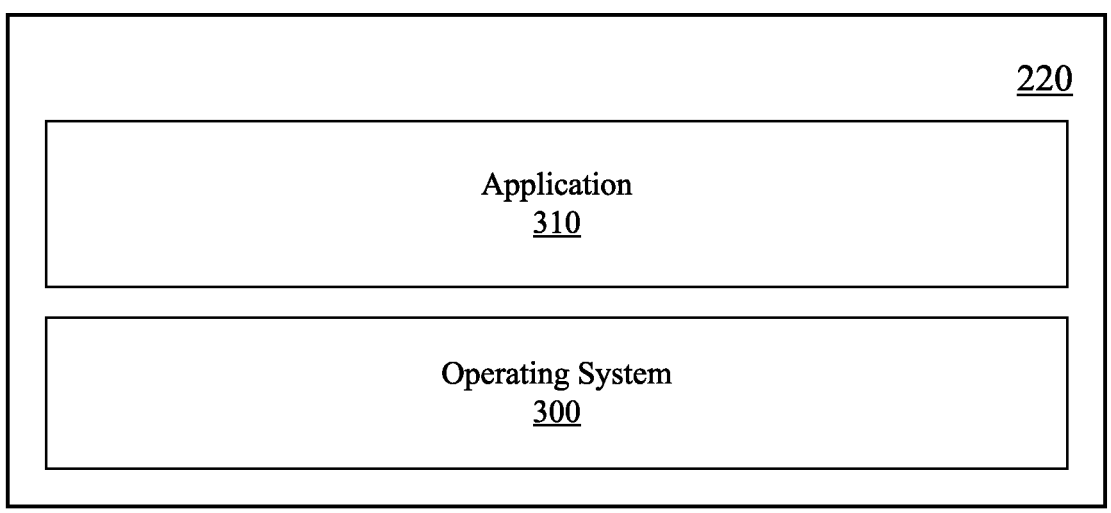
FIG. 3 shows a simplified organization of software components stored in a memory of the example computer device of FIG. 2.

FIG. 3 depicts a simplified organization of software components stored in the memory 220 of the example computer device 200 (FIG. 2). As illustrated, these software components include an operating system 300 and an application 310.

The operating system 300 is software. The operating system 300 allows the application 310 to access the processor 210 (FIG. 2), the memory 220, and the communications module 230 of the example computer device 200 (FIG. 2). The operating system 300 may be, for example, Google™ Android™, Apple™ iOS™, UNIX™, Linux™, Microsoft™ Windows™, Apple OSX™ or the like.

The application 310 adapts the example computer device 200, in combination with the operating system 300, to operate as a device performing a particular function. For example, the application 310 may cooperate with the operating system 300 to adapt a suitable embodiment of the example computer device 200 to operate as the first server computer system 110 and/or the second server computer system 120.

While a single application 310 is illustrated in FIG. 2, in operation the memory 220 may include more than one application 310 and different applications 310 may perform different operations.

As mentioned, the data corruption detection module and the function-performing module are separate modules. In one or more embodiments, the data corruption detection module may include a plurality of data corruption detection tests. Each data corruption detection test may include error-identification processor-executable instructions. The error-identification processor-executable instructions of each data corruption detection test and the processor-executable instructions of the function-performing module may be configured separately and in a blind manner such that configuration of the error-identification processor-executable instructions of each data corruption detection test is done without knowledge of the processor-executable instructions of the function-performing module, and vice versa. Further, the error-identification processor-executable instructions of each data corruption detection test may be configured separately.

As one example, error-identification processor-executable instructions of a data corruption detection test may be configured or otherwise coded by a first group and the processor-executable instructions of the function-performing module may be configured or otherwise coded by a second group, the first and second groups not having access to processor-executable instructions of the other group. In this manner, each data corruption detection test may be configured to check or otherwise determine whether or not the function-performing module is operating as it should.

Put another way, the system 100 may be configured to perform functions on data records and to detect data corruption associated with the performed functions.

Figure 4:
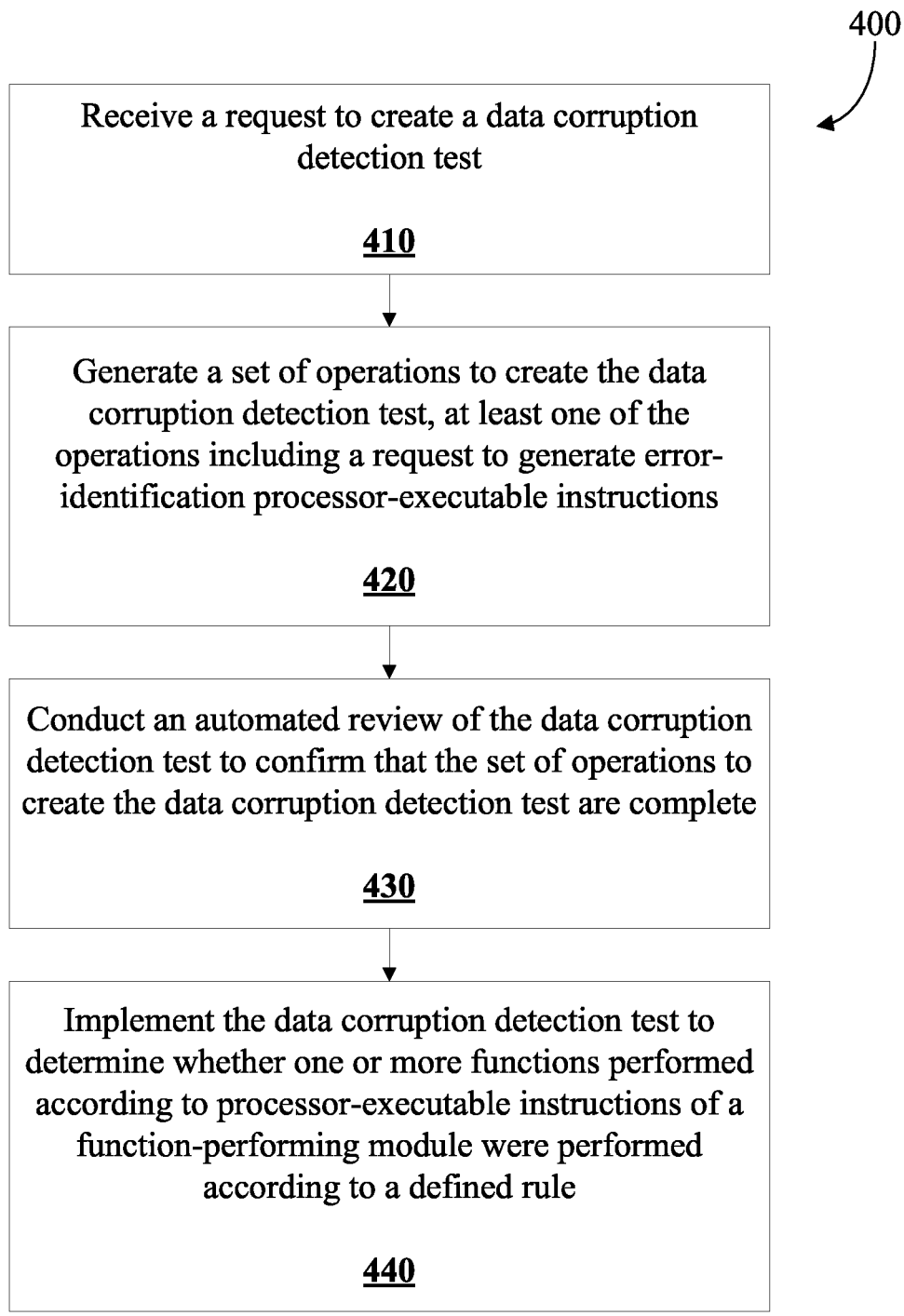
FIG. 4 is a flowchart showing operations performed in implementing a data corruption detection test according to an embodiment.

As mentioned, the system 100 may implement data corruption detection tests. FIG. 4 is a flowchart showing operations performed by the system 100 in implementing a data corruption detection test according to an embodiment. The operations may be included in a method 400 which may be performed by the system 100. For example, processor-executable instructions stored in memory of the second server computer system 120 may, when executed by at least one processor, configure the system 100 to perform the method 400 or a portion thereof.

The method 400 includes receiving a request to create a data corruption detection test (step 410).

The data corruption detection test is a test that may be used to detect data corruption by determining whether one or more functions performed by a function-performing module were performed according to a defined rule.

In one or more embodiments, the request to create the data corruption detection test may be received from a computing device. For example, a user may operate the computing device to open up a particular software program to initiate creation of a data corruption detection test. In response, the computing device may communicate the request to create the data corruption detection test to the second server computer system 120.

The request to create the data corruption detection test may include information that identifies reasons for the data corruption detection test and the information may be defined, for example, by tags or keywords that may be used to identify or locate the data corruption detection test once it has been created.

The method 400 includes generating a set of operations to create the data corruption detection test, at least one of the operations including a request to generate error-identification processor-executable instructions (step 420).

In response to receiving the request to create the data corruption detection test, the second server computer system 120 generates a set of operations to create the data corruption detection test. The set of operations may be predefined and may include one or more tasks that must be completed before the data corruption detection test can go live. In one or more embodiments, the set of operations may be used to guide the user who initiated the creation of the data corruption detection test. Further, in one or more embodiments, the set of operations may ensure that the data corruption detection test is created in a standardized manner and this may be done for compliance reasons, for example.

In one or more embodiments, in response to receiving the request to create the data corruption detection test, the second server computer system 120 may engage an application programming interface (API) such as for example a JIRA Rest API to create the set of operations to create the data corruption detection test.

At least one of the operations includes a request to generate error-identification processor-executable instructions. This operation requests the user to generate computer program code in the form of error-identification processor-executable instructions which, when executed, perform operations to determine whether one or more functions performed by the function-performing module were performed according to a defined rule.

In one or more embodiments, the set of operations may additionally include at least one of creating a test plan, creating a test purpose, passing an automated review, passing a secondary review, and output validation.

The test plan and the test purpose may define what the data corruption detection test is to be used for. The test plan and the test purpose may be stored in a database and may be used to identify and provide details about the data corruption detection test.

Passing the automated review may ensure that the error-identification processor-executable instructions are error free and perform as expected. The automated review may be performed by a review module associated with a particular software application used to create the test. Once requested, the automated review may be performed automatically and without user input. The automated review may be executed by at least one processor according to predefined processor-executable instructions that may cause the at least one processor to analyze the data corruption detection test according to a number of steps that assigned a "pass" or a "fail" based on the results of the test. Example steps may include, for example, determining that the set of operations have been completed, determining that the test purpose and the test plan have been defined, determining that the name of the test follows a standard naming format, determining that the error-identification processor-executable instructions are error free, determining that the error-identification processor-executable instructions have been downloaded onto the computing device executing the particular software application, determining that the error-identification processor-executable instructions have been imported successfully, confirming that the error-identification processor-executable instructions have been generated according to a template, confirming that the error-identification processor-executable instructions has appropriate metadata, and confirming that the error-identification processor-executable instructions runs successfully. The automated review may generate instructions for the secondary review.

Passing the secondary review may be performed by a user that did not generate the test and did not write the error-identification processor-executable instructions. Put another way, the secondary review may be assigned to a different user than the user who created the test. The secondary review may include a manual review that includes a number of steps to be evaluated, where at least some of the steps are steps also evaluated by the automated review. The secondary review may include one or more additional steps that may include, for example, evaluating the import time, run time, etc. of the test to ensure the test is executing in an efficient manner. The secondary review may be performed according to instructions generated by the automated review.

The user who created the test may complete the set of operations to create the data corruption detection test. For example, the user who created the test may complete the test plan and the test purpose. Further, the user may create or write the error-identification processor-executable instructions and this may be done using a computer programming language. The error-identification processor-executable instructions include instructions that are to be performed by at least one processor to determine whether one or more functions performed according to processor-executable instructions of a function-performing module were performed according to a defined rule. In this manner, the user who created the test may be guided to complete the set of operations to ensure that the test is created according to a format that may be for compliance reasons and/or for standardization reasons. Put another way, the user who created the test is forced to complete the entire set of operations and this ensures standards are followed.

Further, the creation of the test is simplified in that the user is only requested to complete the set of operations generated by the second server computer system 120. As a result, the overall reliance on computer resources such as for example memory, processing cycles is reduced as processor-executable instructions and other memory and processor consuming computer operations that are not required are not unnecessarily created by the user.

Output validation may include confirming that the output of the data corruption detection test is accurate.

The method 400 includes conducting an automated review of the data corruption detection test to confirm that the set of operations to create the data corruption detection test is complete (step 430).

In one or more embodiments, the user who created the test may complete the set of operations and may request the automated review of the data corruption detection test by, for example, selecting a selectable interface element presented on a display screen of a computing device executing the particular software application for creating the test. In response, the second server computer system 120 may engage the review module and the review module may automatically perform the automated review of the data corruption detection test without human intervention.

As mentioned, the automated review may be executed by at least one processor according to predefined processor-executable instructions that may cause the at least one processor to analyze the data corruption detection test according to a number of steps that assigned a "pass" or a "fail" based on the results of the test. As such, the review module may cause the at least one processor to execute the predefined processor-executable instructions to review the data corruption detection test. Upon completion of the test, the review module may cause the display screen of the computing device executing the particular software application for creating the test to display a list that includes the number of steps and the results of the automated review. In these embodiments, the results may include displaying "pass" or "fail" for each one of the steps.

In one or more embodiments where at least one of the steps is determined to "fail," the user who created the test may be prompted to correct the deficiency that caused the step to "fail". For example, the name of the test may have been found to be non-compliant with a naming format, and as such a prompt may be displayed on the display screen of the computing device executing the particular software application for creating the test indicating the error and requesting that the user correct the name such that it is compliant with the naming format. As another example, the error-identification processor-executable instructions may not have run successfully and as such a prompt may be displayed indicating that the error-identification processor-executable instructions did not run successfully. The user may then go and fix the error-identification processor-executable instructions.

In embodiments where at least one of the steps is determined to "fail," the user must go correct the error and perform the automated review. This process may be repeated until all of the steps of the automated review have "passed."

When it is determined that all of the steps of the automated review have "passed," the second server computer system 120 determines that the set of operations to create the data corruption detection test is complete. The data corruption detection test is thus determined to be ready to go live.

It will be appreciated that in one or more embodiments, a secondary review may be requested before the data corruption detection test is determined to be ready to go live and as such, upon completion of the automated review, the data corruption detection test may be assigned to another for secondary review. In these embodiments, only when the secondary review is complete, is the data corruption detection test determined to be ready to go live and this may be determined in response to receiving an indication that the data corruption detection test has passed the secondary review.

The method 400 includes implementing the data corruption detection test to determine whether one or more functions performed according to processor-executable instructions of a function-performing module were performed according to a defined rule (step 440).

When it is determined that the data corruption detection test is ready to go live, the second server computer system 120 may perform operations to implement the data corruption detection test. In one or more embodiments, when implementing the data corruption detection test, the second server computer system 120 may perform operations to change a status of the data corruption detection test from in development to live.

In one or more embodiments, implementing the data corruption detection test may include periodically implementing the data corruption detection test to determine whether one or more functions performed according to the processor-executable instructions of the function-performing module were performed according to the defined rule. For example, the data corruption detection test may be implemented or executed once every day at a particular time. As another example, the data corruption detection test may be implemented or executed once every hour. As yet another example, the data corruption detection test may be implemented in response to a trigger such as for example when a threshold number of data records have been updated within a particular time period.

In one or more embodiments, implementing the data corruption detection test may include executing the error-identification processor-executable instructions of the data corruption detection test to cause the at least one processor to determine whether the one or more functions performed according to the processor-executable instructions of the function-performing module were performed according to the defined rule.

Responsive to implementing the data corruption detection test to determine whether one or more functions performed according to the processor-executable instructions of the function-performing module were performed according to the defined rule, the result of the data corruption detection test may be automatically communicated to one or more electronic addresses. The one or more electronic addresses may include email addresses. In one or more embodiments, the electronic addresses may be defined by the user who created the test.

Figure 5:
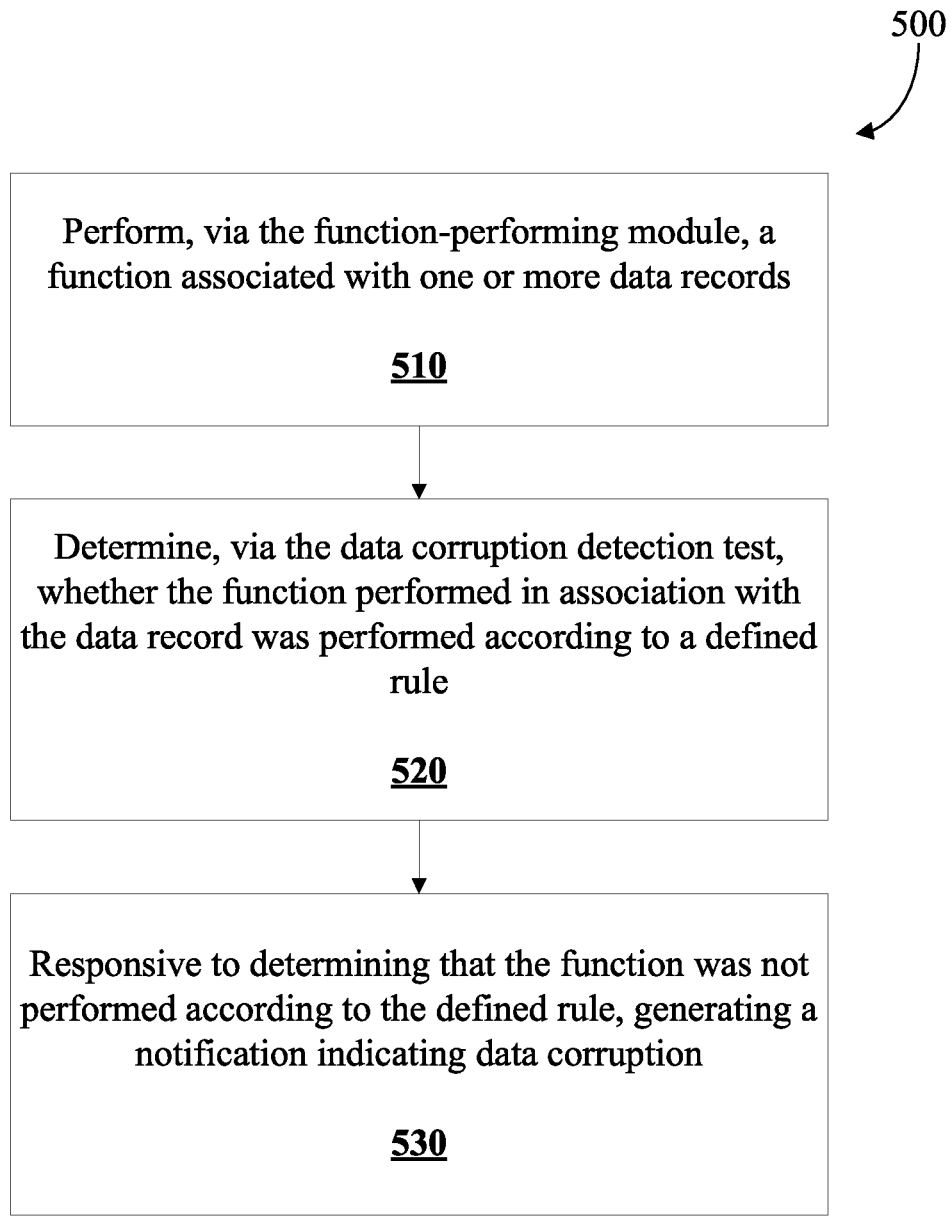
FIG. 5 is flowchart showing operations performed in detecting data corruption using the data corruption detection test according to an embodiment.

In one or more embodiments, the data corruption detection test may be implemented to detect data corruption. FIG. 5 is a flowchart showing operations performed by the system 100 in detecting data corruption using the data corruption detection test according to an embodiment. The operations may be included in a method 500 which may be performed by the system 100. For example, processor-executable instructions stored in memory of the first server computer system 110 and the second server computer system 120 may, when executed by one or more processors, configure the system 100 to perform the method 500 or a portion thereof.

The method 500 includes performing a function associated with a data record (step 510).

The first server computer system 110 includes a function-performing module comprising processor-executable instructions that, when executed by a processor of the first server computer system 110, configure the processor to perform one or more functions on one or more data records. The one or more functions may be performed according to defined rules.

As mentioned, the first server computer system 110 may be a financial institution server and as such a data record may, for example, reflect an amount of value stored in a particular account associated with a user. The data record may be associated with one or more defined rules. The one or more defined rules may include one or more rules defining an input/output modifier to be applied to the value of the data record. The input-output modifier may be based on, for example, a fee, an exchange rate, interest, and/or a transfer. The one or more defined rules may additionally or alternatively include one or more rules defining whether or not a statement is to be generated for a data record. A statement may be, for example, a listing of one or more other functions performed on the data record. The statement may be a paper statement sent to the user through, for example, standard mail or may be an electronic statement sent to the user through, for example, electronic mail.

The one or more defined rules may include a frequency to which other defined rules may be applied. For example, the one or more defined rules may include applying a monthly fee for one or more data records. The monthly fee may be a monthly fee of a bank account. As another example, the one or more defined rules may include generating a monthly statement for a data record.

The one or more defined rules may be defined during a data record configuration process. For example, when a data record is to be generated for a user, one or more rules may be defined for that data record. The defined rules may be adjusted or updated by an administrator associated with the financial institution or may be adjusted or updated by the user through, for example, a mobile banking website hosted by the first server computer system 110. As an example, the user may use a mobile device to log into a mobile banking account associated with their account. The mobile banking account may include a user interface including one or more rules to be applied to the data record associated with the user. The one or more rules may be selected or deselected by the user.

The one or more defined rules may be implemented by the first server computer system 110 by way of processor-executable instructions. For example, the function-performing module of the first server computer system 110 may include processor-executable instructions that, when executed by a processor of the first server computer system 110, configure the processor to perform a function associated with a data record. The processor-executable instructions may include computer program code.

The functions performed by the function-performing module are based on the one or more defined rules. The functions may include applying an input/output modifier to a value of the data record, generating a statement for the account, generating a notification, etc. For example, a function may include adjusting a value of a data record and this may be based on a defined rule defining an input/output modifier and a frequency. As another example, a defined rule may be associated with a monthly fee and the function performed by the function-performing module may include charging the monthly fee by adjusting the value of the data record by a particular amount.

One or more functions performed by the function-performing module may be performed in error. For example, data corruption in the processor-executable instructions of the function-performing module may configure the processor to perform a function on a data record that is not according to a defined rule associated with the data record. The data corruption may be caused by, for example, an error in the processor-executable instructions of the function-performing module. The error may be the result of a coding error. The error may additionally or alternatively be the result of a computer virus or may indicate that the processor-executable instructions have been compromised, tampered with or otherwise corrupted.

When a function performed on a data record is performed in error, it may go undetected. For example, the value of a data record may be adjusted by a particular amount when, for example, one or more defined rules associated with the data record may indicate that the value of the data record is to be adjusted by a different amount. The error may not be identified and thus the data record may continue to be adjusted in error. The error may continue until the user associated with the data record identifies the error and informs the financial institution of the error.

The second server computer system 120 determines whether or not a function has been performed by the first server computer system 110 in error. Specifically, the method 500 includes determining, via the data corruption detection test, whether the function performed in association with the data record was performed according to a defined rule (step 520).

In this embodiment, the data corruption detection test determines whether the function performed in association with the data record was performed according to a defined rule. The determination is made after the function has already been performed on the data record. In this embodiment, there may be a time delay between when the function is performed in association with the data record (by the function-performing module) and when the data corruption detection test determines whether the function was performed according to a defined rule. The time delay may be, for example, one or more days, one or more business days, one or more weeks, etc.

In this embodiment, the second server computer system 120 may receive data from the first server computer system 110 including functions performed on data records by the function-performing module. The data may include an identifier for the data records and functions performed in association with each data record.

For a particular data record, the second server computer system 120 may analyze the received data to identify one or more rules based on the function performed in association with the data record.

In this embodiment, the identified one or more rules based on the function performed in association with the data record are compared to the defined rules associated with the data record. When the identified one or more rules match at least one of the defined rules associated with the data record, the data corruption detection test determines that there are no errors and thus no further action is required.

Responsive to determining that the function was not performed according to a defined rule, the method 500 includes generating a notification indicating data corruption and identifying the data record (step 530).

In one or more embodiments, the output of the data corruption detection test may indicate an error in the processor-executable instructions of the function-performing module.

In one or more embodiments, when the identified one or more rules do not match at least one of the defined rules associated with the data record, the data corruption detection test determines that the function was not performed according to the one or more defined rules associated with the data record and that this indicates data corruption.

A notification is generated by the data corruption detection test. The notification may be sent as a signal to the first server computer system 110, the signal causing the first server computer system 110 to display the notification indicating data corruption. The notification may include identifying information of the data record and information regarding the error.

The data corruption detection test may correct the rule applied to the data record to ensure it is in-line with the defined rule associated with the data record. For example, the data corruption detection test may send a signal to the function-performing module, the signal including the defined rule associated with the data record and causing the function-performing module to associate the defined rule with the data record. In this manner, the detected data corruption may be automatically corrected by the data corruption detection test.

As mentioned, in embodiments the function associated with the data record may include adjusting a value of the data record. During step 520, responsive to determining that the function was not performed according to the defined rule, the value of the data record may be adjusted by an amount equal to an amount adjusted by the function-performing module. In this manner, the amount of value adjusted by the function-performing module is negated or otherwise corrected by the data-correction checking module.

In manners described above, the system 100 may be used to detect data corruption associated with automated functions performed by the function-performing module.

Examples of data corruption detection will now be described. The examples may be performed in accordance with the methods and systems described herein.

In an example, a data record may be associated with a defined rule indicating that the account associated with the data record does not have a monthly fee. The function-performing module may perform a function on the data record which may include applying an input/output modifier in an amount of $10 at a frequency of one-month. After the input/output modifier is applied to the data record, the data corruption detection test may receive data indicating functions performed in association with the data record. The data corruption detection test may identify that a monthly fee of $10 was applied to the data record. The data corruption detection test may compare the identified rule that was applied to the data record (applying a $10 monthly fee) to the defined rule associated with the data record (no monthly fee) and thus determines that the function was not performed according to the defined rule. The data corruption detection test may generate a notification indicating data corruption and identifying the data record. The data corruption detection test may also correct the error by adjusting the value of the data record by $10 or may send a signal to the function-performing module causing the function-performing module to correct the error. The data corruption detection test may also correct the rule applied to the data record to ensure it is in-line with the defined rule associated with the data record.

In another example, a data record may be associated with a defined rule indicating that an account associated with the data record is required to receive a monthly statement. The data corruption detection test may receive data indicating functions performed in association with the data record and may determine that no statement has been generated for the account associated with the data record in the last thirty (30) days. Put another way, the data corruption detection test may compare data indicating functions performed in associated with the data record to the defined rule associated with the data record (generate a monthly statement) and thus may determine that a function has not been performed according to the defined rule. The data corruption detection test may generate a notification indicating data corruption and identifying the data record. The data corruption detection test may also correct the error by generating a monthly statement or may send a signal to the function-performing module causing the function-performing module to generate a monthly statement. The data corruption detection test may also correct the rule applied to the data record to ensure it is in-line with the defined rule associated with the data record.

In yet another example, a data record may be associated with a defined rule indicating an interest rate to be charged to a value stored in the data record. The value stored in the data record may be, for example, a mortgage amount. The function performing module may perform a function on the data record which may include charging interest on the value of the data record. After the interest is charged on the value of the data record, the data corruption detection test may receive data indicating functions performed in association with the data record. The data corruption detection test may identify that interest was charged to the value of the data record at a rate of 2.5%. The data corruption detection test may compare the identified rule that was applied to the data record (charging 2.5% interest) to the defined rule associated with the data record (charging prime minus 0.5% interest) and may determine that the function was not performed according to the defined rule. The data corruption detection test may generate a notification indicating data corruption and identifying the data record. The data corruption detection test may also correct the error by adjusting the amount of interest charged or may send a signal to the function-performing module causing the function-performing module to correct the error. The data corruption detection test may also correct the rule applied to the data record to ensure it is in-line with the defined rule associated with the data record.

In still yet another example, a data record may be associated with a defined rule indicating that an input/output modifier is to be applied to the value of the data record in the event that the value of the data record is below zero. The function-performing module may perform a function on the data record which may include applying an input/output modifier to the data record when the value is zero. After the input/output modifier is applied to the data record, the data corruption detection test may receive data indicating functions performed in association with the data record. The data corruption detection test may identify that an input/output modifier was applied to the data record as a result of the value of the data record being equal to zero. The data corruption detection test may compare the identified rule that was applied to the data record (applying an input/output modifier when the value of the data record is zero) to the defined rule associated with the data record (applying an input/output modifier when the value of the data record is below zero) and thus determines that the function was not performed according to defined rule. The data corruption detection test may generate a notification indicating data corruption and identifying the data record. The data corruption detection test may also correct the error by adjusting the value of the data record by value of the input/output modifier or may send a signal to the function-performing module causing the function-performing module to correct the error. The data corruption detection test may also correct the rule applied to the data record to ensure it is in-line with the defined rule associated with the data record.

It will be appreciated that in embodiments the one or more defined rules described herein may be based on, for example, regulatory rules, contractual terms, business intent rules, etc. Regulatory rules include rules that the financial institution associated with the financial institution server may be required, by law, to comply with. Contractual terms include rules that the financial institution has agreed to follow in a contract with a customer. Business intent rules include rules that the financial institution intends to follow even though they may not be required to follow these rules by law.

In one or more embodiments, one or more of the server computer systems described herein may maintain a database that includes a number of data corruption detection tests. A user may operate a computing device executing a particular software program to find one or more of the data corruption detection tests. For example, the user may enter a keyword or a tag that may be used to locate or identify one or more data corruption detection tests. It will be appreciated that only data corruption detection tests that are "live" may be located or identified. Once a data corruption detection test is located or identified by the user, the user may subscribe to the data corruption detection test. The results of the data corruption detection test may be automatically communicated to an electronic address of the user. The electronic address may include, for example, an email address of the user. In this manner, any users that have access to the database may subscribe to one or more data corruption detection tests. Each time a data corruption detection test is implemented and/or executed, the results of the data corruption detection test may be automatically communicated to the electronic addresses of all subscribers of the data corruption detection test.

In one or more embodiments, one or more of the server computer systems described herein may implement and/or execute all of the data corruption detection tests that are live. For example, the user who created the test may define that the data corruption detection test is to be implemented at the end of each business day, which may be 5:00 PM, and as such the data corruption detection test may be implemented at 5:00 PM on every business day. One or more of the data corruption detection tests may not have instructions as to when they are to be implemented. In these examples, the one or more server computer systems may communicate with a network analyzer that may be configured to monitor network traffic. When it is determined that the network traffic is below a threshold, the server computer system may implement one or more of the live data corruption detection tests. As another example, during the automated or secondary reviews of a data corruption detection test, the server computer system may log or may record the run time of the data corruption detection test. The server computer system may select one or more of the data corruption detection tests based on processor or network availability and based on the run time of the data corruption detection test. For example, the server computer system may determine that at least one processor is available for a period of time and as such the server computer system may cause the at least one processor to implement one or more data corruption detection tests that have a run time less than the period of time.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A system comprising:
   at least one processor; and
   a memory coupled to the at least one processor, the memory storing processor-executable instructions that, when executed, configure the at least one processor to:
   receive a request to create a data corruption detection test;
   generate a set of operations to create the data corruption detection test, at least one of the operations including a request to generate error-identification processor-executable instructions;
   conduct an automated review of the data corruption detection test to confirm that the set of operations to create the data corruption detection test are complete; and
   implement the data corruption detection test by executing the error-identification processor-executable instructions of a data corruption detection module that is separate from a function-performing module and configured without access to processor-executable instructions of the function-performing module to determine whether one or more functions performed according to the processor-executable instructions of the function-performing module were performed according to a defined rule.

2. The system of claim 1, wherein when implementing the data corruption detection test, the processor-executable instructions, when executed by the at least one processor, further configure the at least one processor to:
   execute the error-identification processor-executable instructions to cause the at least one processor to determine whether the one or more functions performed according to the processor-executable instructions of the function-performing module were performed according to the defined rule.

3. The system of claim 2, wherein the processor-executable instructions, when executed by the at least one processor, configure the at least one processor to:
   determine that the one or more functions were not performed according to the defined rule; and
   in response to determining that the one or more functions were not performed according to the defined rule, generate a notification indicating data corruption.

4. The system of claim 3, wherein the data corruption indicates an error in the processor-executable instructions of the function-performing module.

5. The system of claim 1, wherein responsive to conducting the automated review of the data corruption detection test, the processor-executable instructions, when executed by the at least one processor, configure the at least one processor to:
   assign the data corruption detection test for a secondary review; and receive an indication that the data corruption detection test has passed the secondary review.

6. The system of claim 1, wherein when implementing the data corruption detection test, the processor-executable instructions, when executed by the at least one processor, configure the at least one processor to:
change a status of the data corruption detection test from in development to live.

7. The system of claim 1, wherein the processor-executable instructions, when executed by the at least one processor, configure the at least one processor to:
wherein implementing the data corruption detection test includes selecting the data corruption detection test for execution based on at least one of processor and network availability.

8. The system of claim 1, wherein the processor-executable instructions, when executed by the at least one processor, configure the at least one processor to:
responsive to implementing the data corruption detection test to determine whether one or more functions performed according to the processor-executable instructions of the function-performing module were performed according to the defined rule, automatically communicate results of the data corruption detection test to one or more electronic addresses.

9. The system of claim 1, wherein the one or more functions are performed in association with at least one data record.

10. The system of claim 1, wherein the set of operations include creating a test plan, creating a test purpose, the request to generate the error-identification processor-executable instructions, passing the automated review, passing a secondary review, and output validation.

11. A computer-implemented method performed by at least one processor, the method comprising:
receiving a request to create a data corruption detection test;
generating a set of operations to create the data corruption detection test, at least one of the operations including a request to generate error-identification processor-executable instructions;
conducting an automated review of the data corruption detection test to confirm that the set of operations to create the data corruption detection test are complete; and
implementing the data corruption detection test by executing the error-identification processor-executable instructions of a data corruption detection module that is separate from a function-performing module and configured without access to processor-executable instructions of the function-performing module to determine whether one or more functions performed according to the processor-executable instructions of the function-performing module were performed according to a defined rule.

12. The computer-implemented method of claim 11, wherein when implementing the data corruption detection test, the method further comprises:
executing the error-identification processor-executable instructions to cause the at least one processor to determine whether the one or more functions performed according to the processor-executable instructions of the function-performing module were performed according to the defined rule.

13. The computer-implemented method of claim 12, further comprising:
determining that the one or more functions were not performed according to the defined rule; and
in response to determining that the one or more functions were not performed according to the defined rule, generating a notification indicating data corruption.

14. The computer-implemented method of claim 13, wherein the data corruption indicates an error in the processor-executable instructions of the function-performing module.

15. The computer-implemented method of claim 11, wherein responsive to conducting the automated review of the data corruption detection test, the method further comprises:
assigning the data corruption detection test for a secondary review; and
receiving an indication that the data corruption detection test has passed the secondary review.

16. The computer-implemented method of claim 11, wherein when implementing the data corruption detection test, the method further comprises:
changing a status of the data corruption detection test from in development to live.

17. The computer-implemented method of claim 11, wherein implementing the data corruption detection test includes selecting the data corruption detection test for execution based on at least one of processor and network availability.

18. The computer-implemented method of claim 11, further comprising:
responsive to implementing the data corruption detection test to determine whether one or more functions performed according to the processor-executable instructions of the function-performing module were performed according to the defined rule, automatically communicating results of the data corruption detection test to one or more electronic addresses.

19. The computer-implemented method of claim 11, wherein the one or more functions are performed in association with at least one data record.

20. At least one non-transitory computer readable storage medium comprising processor-executable instructions which, when executed, configure at least one processor to:
receive a request to create a data corruption detection test;
generate a set of operations to create the data corruption detection test, at least one of the operations including a request to generate error-identification processor-executable instructions;
conduct an automated review of the data corruption detection test to confirm that the set of operations to create the data corruption detection test are complete; and
implement the data corruption detection test by executing the error-identification processor-executable instructions of a data corruption detection module that is separate from a function-performing module and configured without access to processor-executable instructions of the function-performing module to determine whether one or more functions performed according to the processor-executable instructions of the function-performing module were performed according to a defined rule.

* * * * *